May 22, 1973 R. G. RUDD 3,734,736

IMPERVIOUS SURROUND FOR FILM INSERT IN RECORD CASE

Filed Oct. 5, 1970

ROBERT G. RUDD
INVENTOR.

BY Lloyd F. Seebach

AGENT

United States Patent Office 3,734,736
Patented May 22, 1973

3,734,736

IMPERVIOUS SURROUND FOR FILM INSERT IN RECORD CASE

Robert G. Rudd, Rochester, N.Y., assignor to Eastman Kodak Company, Rochester, N.Y.

Continuation-in-part of application Ser. No. 18,967, Mar. 12, 1970. This application Oct. 5, 1970, Ser. No. 78,135
Int. Cl. G03c *1/76*
U.S. Cl. 96—67 4 Claims

ABSTRACT OF THE DISCLOSURE

A barrier layer surrounds a photographic film insert mounted in a record card. The barrier is formed by a suitable solvented resinous material, such as a solvented polyvinyl resin, polyacrylate resin, or by a pressure or thermal sensitive tape, and prevents developer solution from contacting the record card during processing of the exposed insert.

This application is a continuation-in-part of my pending U.S. application Ser. No. 18,967, filed Mar. 12, 1970, now abandoned.

FIELD OF THE INVENTION

This invention relates to record cards and more particularly to an improved form of aperture card and to a method by which a photosensitive film insert mounted on said card relative to the card aperture can be processed over its entire light sensitive area.

DESCRIPTION OF THE PRIOR ART

The use of photosensitive film inserts in record cards has gained wide acceptance as means for storage and retention of information. Initially, the film inserts were produced from a film strip which was exposed, developed and then cut into the individual inserts. The film strip was not cut into discrete inserts until processing of the strip had been completed. Subsequent improvements in record card production equipment resulted in cards with an unexposed photosensitive film insert mounted therein, thereby reducing the time and complexity of equipment necessary for matching a record card with its proper film insert. Processing equipment for development of the latent image on the film insert already mounted in its record card utilized a clamping or gasket means which mechanically sealed a cuplike structure to the record card and over film insert for retention of developer solutions. However, such processing equipment suffered from the defect that processing of the film insert was accomplished only with respect to an area which was smaller than the total area of the film insert. When attempts were made to process the entire area of the film insert, card deterioration resulted from the application of the solutions necessary for film development. In addition, image contamination occurred because of residual chemicals which remained on the film insert at the boundary created by sealing a gasket means directly to the film insert.

SUMMARY OF THE INVENTION

The principal object of the present invention is to provide a record card which carries therein a film insert which, after being exposed, can be processed over its entire area and a method of processing such a record card. A further object of this invention is to provide a record card which minimizes card loss due to deterioration because of chemical reactions between developer solutions and record card material. A still further object of the invention is to eliminate contamination of the film insert due to residual chemicals which remain at the sealing point of the gasket means and the film insert.

Yet another object of the invention is to provide a method by which the latent image on a photosensitive film mounted relative to an aperture in a record card can be developed or processed without contaminating the card with the processing solutions. The invention and its objects and advantages will become apparent to those skilled in the art by the detailed description of the preferred embodiments presented below.

BRIEF DESCRIPTION OF THE DRAWINGS

In the detailed description of the preferred embodiments presented below, reference is made to the accompanying drawing wherein.

DESCRIPTION OF THE PREFERRED EMBODIMENTS

Figures 1, 2:
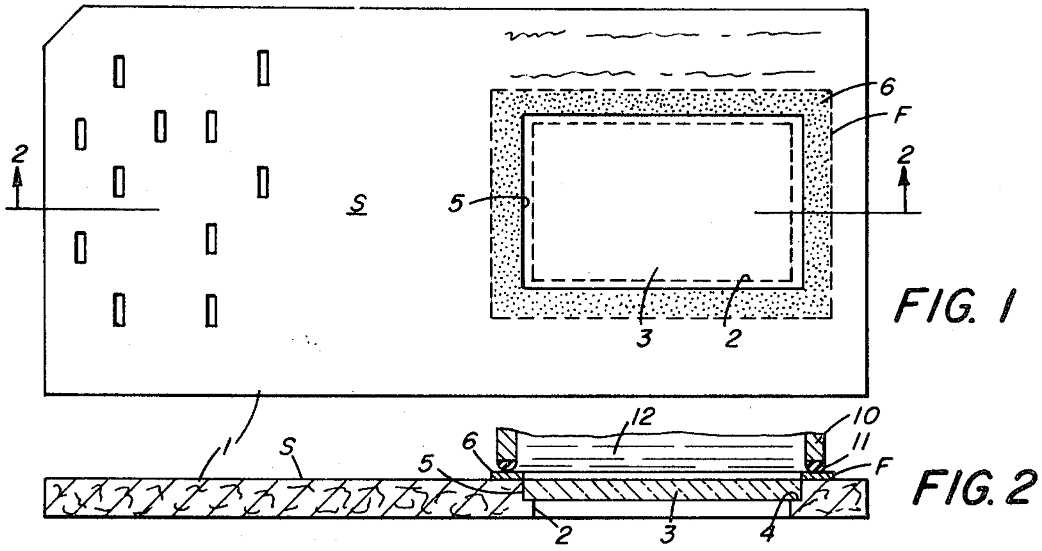
FIG. 1 is a plan view of a record card constructed in accordance with the present invention and showing one arrangement for confining the development solutions to the film insert.
FIG. 2 is a sectional view of a record card taken along the line 2—2 of FIG. 1.

Referring now to FIG. 1, a conventional record card 1 is provided with an aperture 2 with respect to which a film insert 3 can be mounted in any one of several ways. As shown in FIGS. 1 and 2, film insert 3 can be mounted relative to aperture 2 on a shoulder 4 which is formed in card 1 by a recess 5 which is at least as large dimensionwise as film insert 3. The film insert 3 generally comprises a transparent support having a light-sensitive emulsion layer on a surface thereof and is generally supported and secured to the card in any well known manner with respect to the support. As a result, the emulsion layer is left completely exposed for contact by the processing solutions. Hence, the emulsion layer is, generally speaking, coplanar with a surface S of card 1.

An area F in the form of a frame surrounds recess 5 on the surface S of card 1 and comprises a layer or application of a solvented resinous material 6, examples of which will be described in more detail hereinbelow. The criteria for selecting the resinous material is that it be impervious to the alkaline solutions normally used in the processing of silver halide light sensitive materials. The resinous material is solvented and can be either painted or sprayed onto the surface S of card 1, this surface being the one which comes into contact with the developer solutions during processing of film insert 3.

Figure 3:
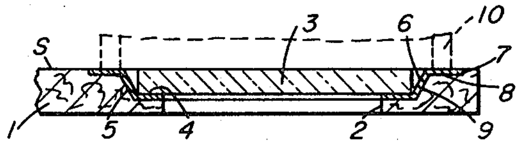
FIG. 3 is a partial view similar to FIG. 2 showing another card embodiment in which a second shoulder or recess is formed in the record card.

Should the card thickness be critical, an additional recess 7 can be formed in the card to provide a shoulder 8 adjacent surface S, as shown in FIG. 3. In this case, recess 5 can be provided with sloping side walls 9 and the resinous material 6 is then applied to both recesses and may also serve to retain film insert 3 in recess 5.

Figure 5:
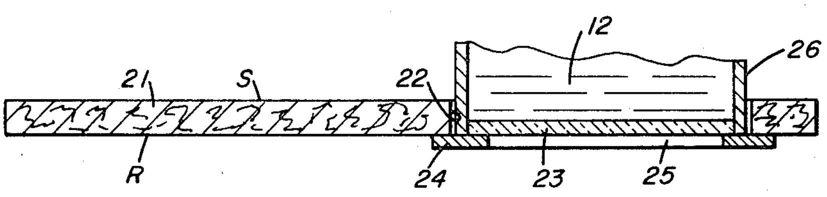
FIG. 5 is a sectional view of a record card taken along the line 5—5 of FIG. 3 and showing another arrangement for confining the development solutions to the film insert.

As will be seen by referring to FIG. 2, the present invention provides a record card 1 containing an unexposed film insert 3 which can be exposed in appropriate equipment to produce a latent image, such as a latent microfilm image of a document. After exposure of a film insert 3, it can be placed or positioned in suitable developing apparatus in which a processing head, generally designated by the numeral 10 and including a peripheral sealing member 11, can be brought into contact with a least a portion of layer 6. The photographic processing solutions 12 can then be introduced into the head 10 and confined thereby to the emulsion layer of the film insert 3 without contacting any portion or surface of the card 1. After the necessary solutions have been applied to the film insert 3 for the required times, the head 10 can be removed. Thus, the entire emulsion layer of the film insert 3 is developed and hardened so that no undeveloped, unhardened border of emulsion remains on the film insert 3 which can adversely affect the future use and legibility of the film image. The head 10 is urged against card 1 with some pressure so as to insure a seal between material 6 and member 11. As shown in FIG. 5, member 11 can be eliminated if the surface of the head which engages material 6 is made very flat so as to provide the necessary seal with said material when placed in contact therewith.

Polyvinyl resins are one example of resinous materials suitable for use as a barrier layer in the practice of the invention and are characterized by being derived from monomers having the following structure:

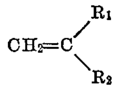

wherein $R_1$ and $R_2$ represent hydrogen, alkyl, halogen, or other groups. Polyvinyl resins such as polyvinyl acetal, polyvinyl butyral; polyvinyl formal and polyvinyl acetate, are solvented to a viscosity suitable for brushing or spraying. The area F surrounding the film insert on a conventional record card is sprayed or brushed with the solvented polyvinyl resin to form a continuous coating. When dry, the coating is impervious to alkaline processing solutions and protects the record card from being damaged by such solutions during processing of the film insert.

Example 1

The following is a specific example of one polyvinyl resin which can be used in the practice of the invention.

A conventional record card having a silver halide film insert mounted therein was coated on the surface of the card relative to and surrounding the recess in which the film insert was mounted with the following composition. Polyvinyl butyral resin was solvented in methylethyl ketone to a viscosity convenient for painting with a brush. A frame-like area about the film insert recess or opening and on the surface of the card generally coplanar with the emulsion layer of the film insert was painted with the solution to form a continuous layer which was not thick enough to affect the relative flatness of the card. When the coating was dry, the layer was impervious to alkaline processing solutions and protected the card from the solutions used to process the film insert.

Acrylic and polyacrylate resins, such as polymers of methyl methacrylate, ethyl acrylate and acrylonitrile, are also suitable for use as a barrier layer in the practice of the invention. After solventing to a viscosity suitable for brushing or spraying, the area surrounding the opening for the film insert is coated with the solvented resin to form a continuous layer in the form of a frame. When dry, the coating is impervious to the alkaline processing solutions used to process the film insert.

Example 2

The following is a specific example of one acrylic resin which can be used in the practice of the invention.

A conventional record card having an aperture with respect to which a silver halide film insert was mounted was coated with an acrylic lacquer by spraying it over an area of the card surface coplanar with the emulsion layer and surrounding the aperture. The film surface was protected by masking means during the spraying operation. The sprayed area formed an effective barrier to alkaline processing solutions when dry.

Figure 4:
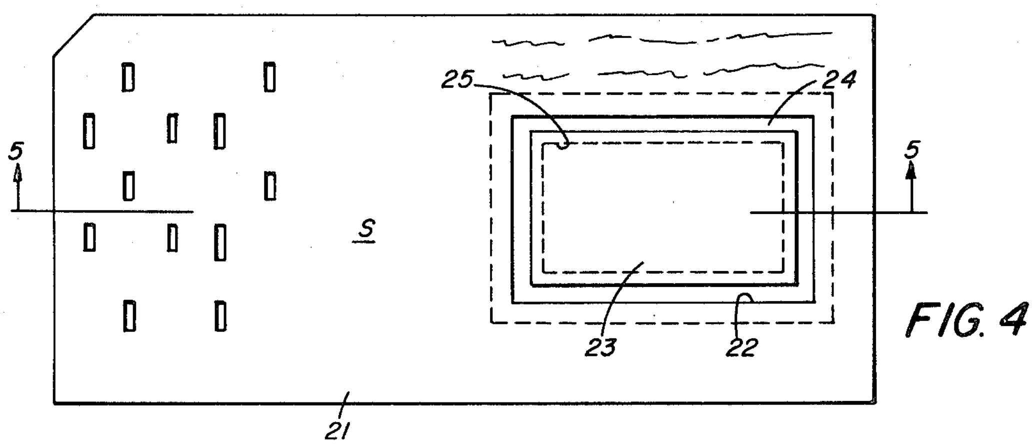
FIG. 4 is a plan view of a record card constructed in accordance with an alternate embodiment of the present invention.

Referring now to FIGS. 4 and 5, an alternate embodiment of the invention is shown, wherein a record card 21 is provided with an aperture 22 that is considerably larger dimensionwise than a film insert 23. A tape member 24 in the form of a frame or a sheet is secured to surface R of card 21 by an adhesive or mechanical means. The portion 25 of tape member 24 within aperture 12 supports the film insert 23 in spaced relation to the aperture 22, preferably by being adhesively secured to the film insert support. In this case, the outer surface of the emulsion layer may be below or coplanar with the surface S of card 21. Tape member 24 is fabricated of a material which is impervious to the alkaline solutions normally used in the processing of silver halide light sensitive materials, examples of which will be given below. After exposure of the film insert 23, it is developed as described above. However, with this card-insert structure, the head 26 is positioned between the inner edge of aperture 22 and the outer edge of film insert 23 so as to confine the developing solutions generally to only the film insert 23. It will be noted with respect to FIGS. 2, 3, and 5 that the heads 10 and 26 confine the solutions 12 to the layer of impervious materials or tape and the film insert so there is very little, if any, possibility of contaminating the record card per se with the processing solutions.

Tape member 24 can be fabricated from any pressure or thermal sensitive tape of polyester or polyethylene material, which is impervious to the alkaline solutions used in the processing of silver halide light-sensitive materials. The tape material can be used to form a frame to hold the film insert as described above in connection with FIGS. 4 and 5 or can be formed as a frame and secured to the surface S of the record card so as to surround the aperture 22 in a manner similar to that in which the material 6 is applied around recess 5 by the spraying or brushing process described in connection with FIGS. 1 and 2.

Example 3

The following is a specific example of one pressure sensitive tape material which can be used in the practice of the invention.

A conventional record card was modified so as to increase the size of the aperture in which the film insert was mounted. A three inch wide (sheet) polyester tape (Mylar—E. I. du Pont de Nemours & Co.) was laid over the aperture and secured to one surface of the card. An unexposed light sensitive film insert was secured centrally to the portion of the tape member within the aperture or opening for the film insert. Such a tape member formed an effective barrier to developer solutions in combination with a gasket or clamping means which was brought into contact with the tape member within the card aperture and between the edges of the taperture and the edges of the film insert during processing thereof.

The invention has been described in detail with particular reference to preferred embodiments, but it will be understood that variations and modifications can be effected within the spirit and scope of the invention.

I claim:

1. A record card having an aperture for mounting a section of photosensitive film which comprises a flat relatively thin card of fibrous card stock of substantially uniform thickness, a piece of silver-halide-bearing photosensitive film extending over said aperture and being secured to said card at the periphery of said aperture, said photosensitive film comprising a support having a silver halide photographic emulsion layer on one surface thereof, said one surface of said photosensitive film being parallel to the surfaces of said card, and a layer of material impervious to alkaline photographic processing solutions disposed on at least one surface of said card about said piece of photosensitive film arranged to protect said one surface of said card from damaging effects of an alkaline photographic processing solution applied to the emulsion layer of said photosensitive film, said alkaline solution impervious material being selected from a group consisting of polyvinyl acetal, polyvinyl butyral, polyvinyl formal, polyvinyl acetate, and polymers of methyl methacrylate, ethyl acrylate and acrylonitrile.

2. The invention according to claim 1 wherein said record card has a shoulder portion surrounding said aperture having a smaller thickness than the remainder of said card, said piece of photosensitive film having dimensions greater than said aperture and less than said shoulder portion, said piece of film being adhered to said shoulder portion.

3. A method of processing an exposed silver halide emulsion-bearing photographic film insert mounted on a record card in registry with an aperture therein wherein a layer of material impervious to an alkaline processing solution is disposed on the surface of said card corresponding to the emulsion side of said film insert and surrounds said aperture, said method comprising the steps of: positioning a sealing member in contact with said impervious layer for confining said processing solution to an area on said card including at least all of said film insert; and applying a processing solution to said area whereby the entire area of said film insert is processed.

4. The method in accordance with claim 3 wherein said sealing member is positioned relative to said film insert and said impervious layer such that said processing solution is applied to only said film insert and the exposed portion of said impervious layer within the confines of said sealing member.

References Cited

UNITED STATES PATENTS

| | | | |
|---|---|---|---|
| 1,086,555 | 2/1914 | Pifer | 96—67 |
| 2,351,877 | 6/1944 | Rabkin | 96—67 |
| 3,195,434 | 7/1965 | Dietz | 40—158 |
| 3,224,917 | 12/1965 | Langan | 40—158 |
| 3,275,439 | 9/1966 | Battison | 96—43 |
| 3,293,996 | 12/1966 | Luning | 40—158 |
| 3,539,344 | 11/1970 | Russell | 96—67 |
| 3,604,799 | 9/1971 | Anderson | 96—67 |

NORMAN G. TORCHIN, Primary Examiner

J. R. HIGHTOWER, Assistant Examiner

U.S. Cl. X.R.

40—158